(12) United States Patent
Peng

(10) Patent No.: US 7,363,638 B2
(45) Date of Patent: Apr. 22, 2008

(54) DISK DRIVE WITH ELECTROSTATIC DISCHARGE STRUCTURE

(75) Inventor: Wen-Kuan Peng, Tao-Yuan Hsien (TW)

(73) Assignee: Quanta Storage Inc., Guishan Shiang (TW)

( * ) Notice: Subject to any disclaimer, the term of this patent is extended or adjusted under 35 U.S.C. 154(b) by 308 days.

(21) Appl. No.: 11/163,606

(22) Filed: Oct. 25, 2005

(65) Prior Publication Data

US 2007/0094677 A1 Apr. 26, 2007

(51) Int. Cl.
*G11B 33/14* (2006.01)

(52) U.S. Cl. .................................. 720/650

(58) Field of Classification Search .............. 720/650, 720/601, 610, 652, 609; 360/99.02, 99.06, 360/99.08, 99.11
See application file for complete search history.

(56) References Cited

U.S. PATENT DOCUMENTS

| | | | | |
|---|---|---|---|---|
| 5,684,775 | A * | 11/1997 | Tanaka et al. | 720/650 |
| 6,772,424 | B2 * | 8/2004 | Yeh et al. | 720/610 |
| 6,981,271 | B2 * | 12/2005 | Minase et al. | 720/652 |
| 7,234,149 | B2 * | 6/2007 | Takahashi et al. | 720/601 |
| 2001/0026520 | A1 * | 10/2001 | Watanabe et al. | 369/75.2 |
| 2004/0148614 | A1 * | 7/2004 | Bae | 720/601 |
| 2004/0163094 | A1 * | 8/2004 | Matsui et al. | 720/650 |
| 2005/0183101 | A1 * | 8/2005 | Li et al. | 720/601 |
| 2005/0204370 | A1 * | 9/2005 | Hamaie | 720/601 |
| 2006/0184951 | A1 * | 8/2006 | Shizuya et al. | 720/601 |

* cited by examiner

Primary Examiner—Tianjie Chen
(74) Attorney, Agent, or Firm—Winston Hsu

(57) ABSTRACT

The present invention is a disk drive with an electrostatic discharge structure including a casing having a hollow space inside, and a tray with a spindle motor, which can freely insert into or pull out from the casing. A chassis covers the bottom of the tray and contacts the spindle motor. A bezel in the front of the tray has a hole to accommodate an eject button. A metal sheet is attached to the back of the bezel, surrounds the eject button, and connects with the chassis. A wire connects the spindle motor for grounding. The tray is able to discharge electrostatic charges whenever inserting into or pulling out from the casing.

6 Claims, 2 Drawing Sheets

DISK DRIVE WITH ELECTROSTATIC DISCHARGE STRUCTURE

BACKGROUND OF THE INVENTION

1. Field of the Invention

The present invention relates to a disk drive, and more particularly to an optical disk drive with an electrostatic discharge structure for discharging the electrostatic charges of a user.

2. Description of the Prior Art

An optical disk drive in a computer needs precise electronic components to meet the requests of highly dense memory capacity and very fast signal transmission. However, those precise electronic components are very easy to be destroyed by the electrostatic charges of a user in operating process, so a protection against the electrostatic charges is essential. As shown in FIG. 1, a prior disk drive 10 includes a metal casing 11 with a hollow space and a tray 12 which inserts into or pulls out from the casing 11. There are electronic components, such as a spindle motor rotating a disc, a pick-up head, and a printed circuit board 15 with control elements, arranged on the tray 12, and the base of the tray 12 is covered by a metal chassis 121 for protection. The front of tray 12 places a switch 16, and adjoins a bezel 13 which mounts an eject button 14 corresponding to the switch 16. A metal sheet 20 is attached to the back of the bezel 13. A U-shaped, movable cable 21, placed in a room 22 between the tray 12 and the casing 11, connects the metal sheet 20 and the casing 11 for grounding.

When a finger 17 of the user pushes the eject button 14 to pull out the tray 12, electrostatic charges of the finger 17 are conducted to the metal sheet 20 through gaps 18 between the bezel 13 and the eject button 14. Then, those electrostatic charges of the metal sheet 20 are conducted to the ground of the casing 11 through the cable 21 to discharge. Thus, the disk drive 10 prevents electrostatic charges from conducting to and destroying precise electronic components on the tray 12. Nevertheless, the prior disk drive 10 is additionally equipped with the cable 21 as the electrostatic discharge structure. The disk drive 10 not only enlarges the size but also increases production costs and time. Furthermore, the movable cable 21 is easy to expose outside causing great inconvenience of operation when following the tray 12 to insert into or pull out from the casing 11.

Although another prior optical drive presses the metal sheet to touch the grounded casing instead of the movable cable for discharging electrostatic charges, discharging electrostatic charges only occurs when the tray inserts into the casing. However, when the tray pull out of the casing to cause the spindle motor, the pick-up head and the printed circuit board on the tray to expose outside of the casing, the user is easier to directly touch the tray. At the moment, the disk drive can't discharge electrostatic charges to protect those precise electronic components, and lowers the product quality.

SUMMARY OF THE INVENTION

It is one object of the invention to provide a disk drive with an electrostatic discharge structure which utilizes the original spindle motor, the chassis, and the wire to directly discharge electrostatic charges for simplifying structure and reducing costs.

It is another object of the invention to provide a disk drive with an electrostatic discharge structure which can effectively discharge electrostatic charges whenever the tray inserts into or pulls out from the casing.

For achieving the above objects, the present invention is to provide a disk drive with an electrostatic discharge structure including a casing having a hollow space inside, and a tray with a spindle motor, which can freely insert into or pull out from the casing. A chassis covers the bottom of the tray and contacts the spindle motor. A bezel in the front of the tray has a hole to accommodate an eject button. A metal sheet is attached to the back of the bezel, surrounds the eject button, and connects with the chassis. A wire connects the spindle motor for grounding. The tray is able to discharge electrostatic charges whenever inserting into or pulling out from the casing.

Further features and advantages of the invention, as well as the structure and operation of various embodiments of the invention, are described in detail below with reference to the accompanying drawings.

DETAILED DESCRIPTION

Figure 1:
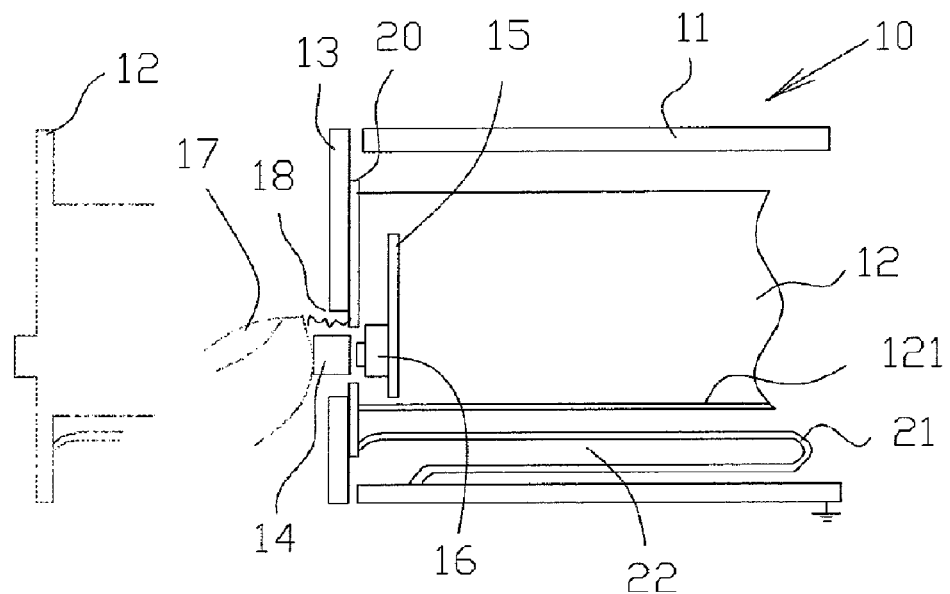
FIG. 1 is a side sectional view of the prior disk drive with an electrostatic discharge structure.
Figure 2:
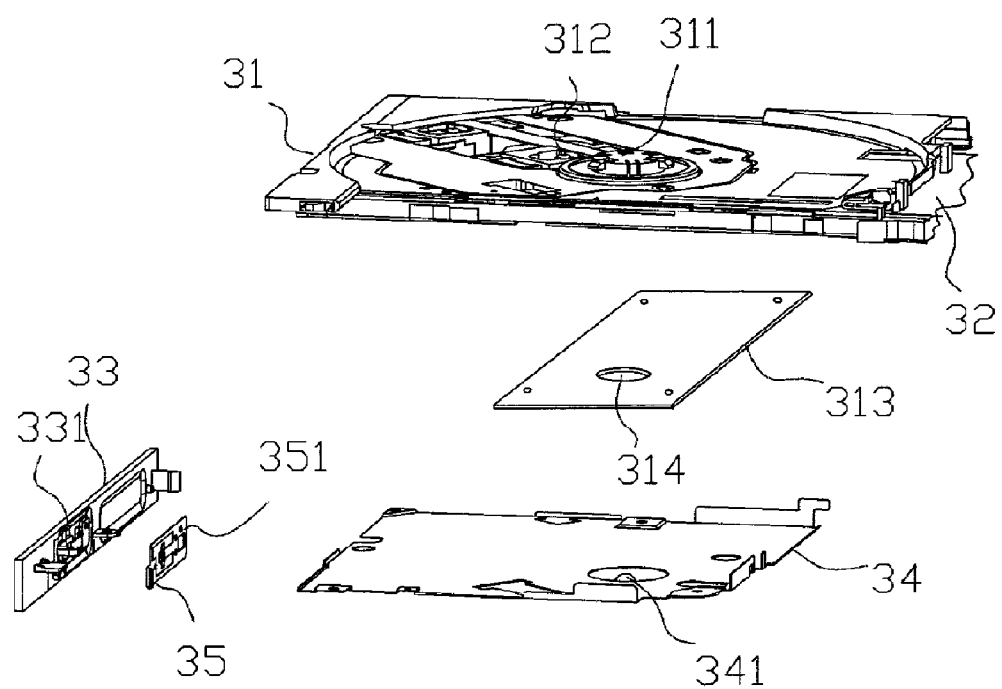
FIG. 2 is a perspective view of the disk drive with an electrostatic discharge structure according to the present invention.
Figure 3:
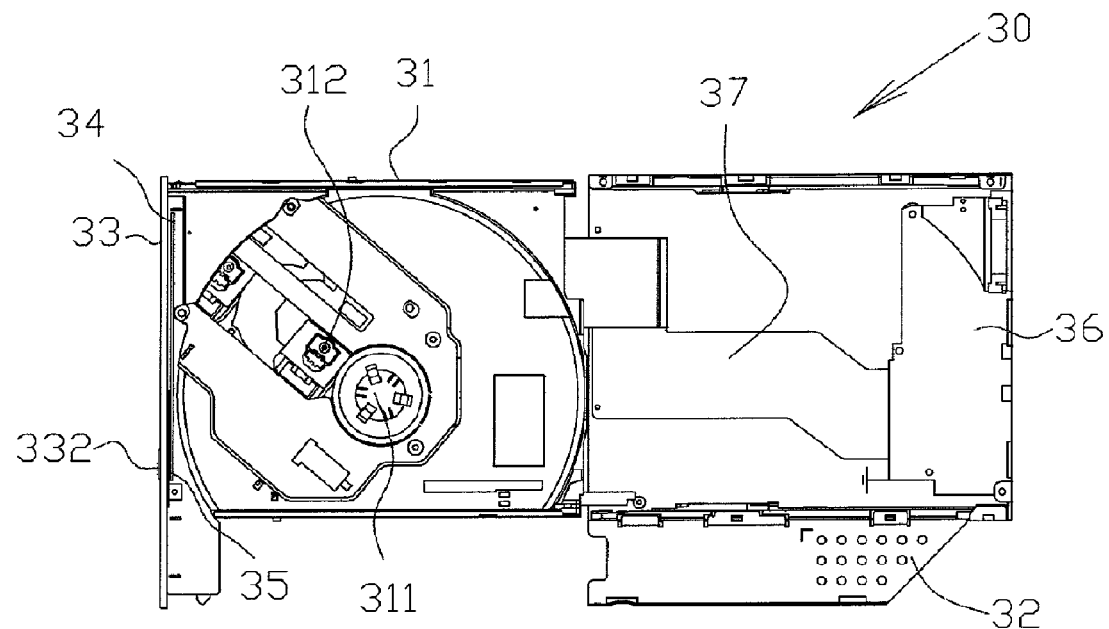
FIG. 3 is a top view of the disk drive with an electrostatic discharge structure according to the present invention.

Referring to FIG. 2 and FIG. 3, an disk drive 30 of the invention includes a tray 31, a casing 32, a bezel 33, and a chassis 34. The bezel 33 is attached in front of the tray 31, and the chassis 34 covers the bottom of the tray 31. The casing 32 has a hollow space which the tray 31 carring a disc can freely insert into and pull out from so as to change the disc.

The tray 31 is equipped with a spindle motor 311 rotating the disc, a pick-up head 312 reading or writing the disc, and a printed circuit board 313 with control electronic components at the base. The printed circuit board 313 disposes an opening 314 corresponding to the rear end, such as the shaft, of the spindle motor 311. The metal chassis 34 having a bigger area covers under the printed circuit board 313, and extends a protrusion 341 corresponding to the rear end of the spindle motor 311. Furthermore, the front of the tray 31 attaches the bezel 33 which has a hole 331 to accommodate a eject button 332 protruded the front of the bezel 33. A metal sheet 35 is attached to the back of the bezel 33 corresponding to the eject button 332, and also has a through hole 351 corresponding to the eject button 332. In this embodiment, the metal sheet 35 is shown as an independent component, but it can also be extended and bended directly from the front of the chassis 34 to simplify the production.

Figure 4:
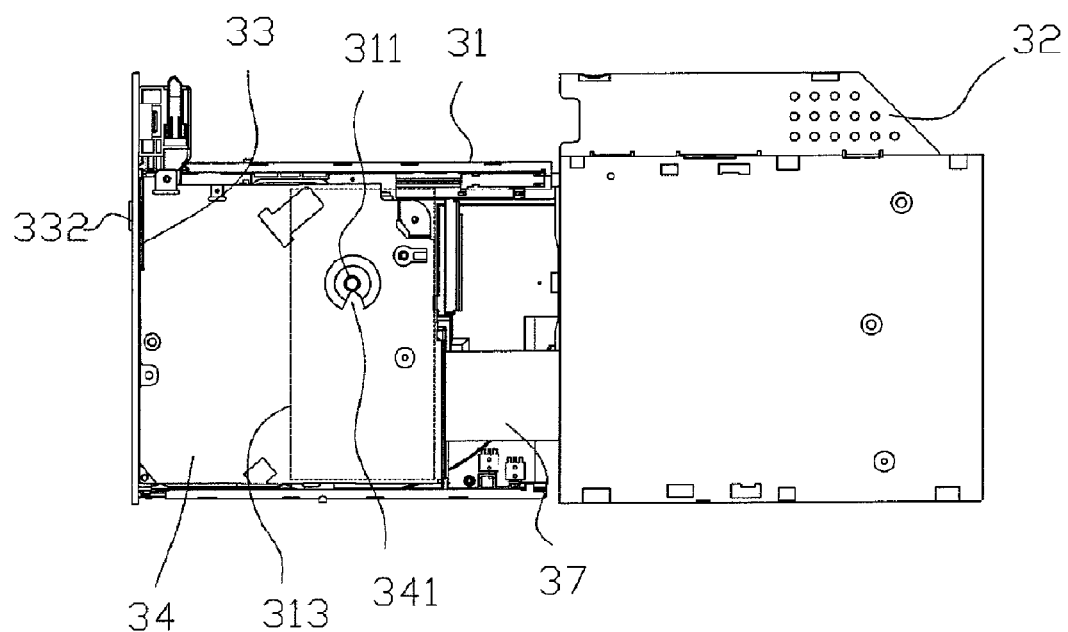
FIG. 4 is a bottom view of the disk drive with an electrostatic discharge structure according to the present invention.

As shown in FIG. 3 and FIG. 4, the disk drive 30 of the invention accommodates the eject button 332 in the hole 331. The eject button 332 protrudes through the through hole 351 of the metal sheet 35 at the back of the bezel 33, and is surrounded by the metal sheet 35. Then, the bezel 33 is attached to the front of the tray 31 to let the eject button 332 come into contact with the loading switch mechanism. Besides, the spindle motor 311 is mounted on the printed circuit board 313 disposed at the base of the tray 31, and its rear end is exposed from the opening 314. The chassis 34 is disposed at the bottom of the tray 31, and the printed circuit board 313 is covered between the chassis 34 and the tray 31. Thus, the protrusion 341 touch the rear end of the spindle motor 311 to form an electrical connection without affecting the normal operation of the spindle motor 311. The chassis 34 extends from the rear end to the front end of the tray 31 to prevent those electronic components on the printed circuit board 313 from electromagnetic interference, and contacts the metal sheet 35 to form an electrical connection.

Moreover, the main circuit board 36 is disposed at the back end of the hollow space of the casing 32. A wire 37 connects the main circuit board 36 with the printed circuit board 313 to supply those components on the tray 31 power and transmit control signals from the main circuit board 36 to the printed circuit board 313. The wire 37 also transmits data signals detected or produced by the printed circuit board 313 to the main circuit board 36 such that those data signals can be modulated into information data for the operation of the host, such as a computer. Meanwhile, the wire 37 provides ground through the ground of the main circuit board 36, for example, the main circuit board 36 contacts the casing 32 for grounding.

When pushing the eject button 332 to pull out the tray 31, electrostatic charges on the finger of the user cause discharging through the gap between the bezel 33 and the eject button 332, and are received by the metal sheet 35, which is attached to the back of the bezel 33 and adjoin the eject button 332. Electrostatic charges are conducted to the chassis 34 electrically connected with the metal sheet 35, enter the spindle motor 311 through the protrusion 341 contacting the rear end of the spindle motor 311, and then, are led into the main circuit board 36 through the wire 37. Finally, those electrostatic charges are conducted to the casing 32 for grounding. Therefore, electrostatic charges are eliminated by means of the ground of the spindle motor 311 without passing by the printed circuit board 313 to prevent precise components from damage.

Since the disk drive 30 utilizes original structures of a traditional optical disk drive, such as the metal sheet 35, the chassis 34, the spindle motor 311, the wire 37, and the main circuit board 36, to form an electrostatic discharge structure without adding any new components, the structure and production costs of the disk drive 30 can be reduced. Besides, the chassis 34 electrically contacts the spindle motor which is always grounded by the connection of the main circuit board 36 through the wire 37. Whenever the tray 31 inserts into or pulls out from the casing 32, the ground circuit remains the connection of the metal sheet 35, the chassis 34, the protrusion 341 the spindle motor 311, the wire 37, and the main circuit board 36 to eliminate electrostatic charges. Therefore, users not only operates the eject button 332 when the tray 31 inserts into the casing 31, but also touches the eject button 332 or the chassis 34 when the tray 31 pulls out from the casing 31, electrostatic charges can be eliminated. As a result, the electrostatic discharge structure of the invention can prevent electrostatic charges from damaging those components on the tray.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A disk drive with electrostatic discharge structure, comprising:
    a casing having a hollow space inside;
    a tray disposed a spindle motor and a chassis, which freely inserts into or pull out from the hollow space, wherein the chassis covers the bottom of the tray and contacts the spindle motor;
    a bezel attached to the front of the tray, which has a hole to accommodate a eject button;
    a metal sheet attached to the back of the bezel, which surrounds the eject button and contact the chassis; and
    a wire connecting the spindle motor for grounding.

2. The disk drive with electrostatic discharge structure of claim 1, further comprising a main circuit board disposed at the back end of the hollow space, wherein the wire connects the spindle motor and the main circuit board for grounding.

3. The disk drive with electrostatic discharge structure of claim 1, further comprising a printed circuit board between the tray and the chassis, wherein the printed circuit board has an opening to mount the spindle motor which contacts the chassis.

4. The disk drive with electrostatic discharge structure of claim 3, wherein the wire connects the spindle motor through the printed circuit board.

5. The disk drive with electrostatic discharge structure of claim 1, wherein the metal sheet is extended and bended from the chassis.

6. The disk drive of claim 1, wherein the chassis is metal.

* * * * *